Nov. 16, 1965  E. C. SWANSON  3,217,731
HYDRAULIC FLOW CONTROL VALVE UNIT
Filed Dec. 1, 1961
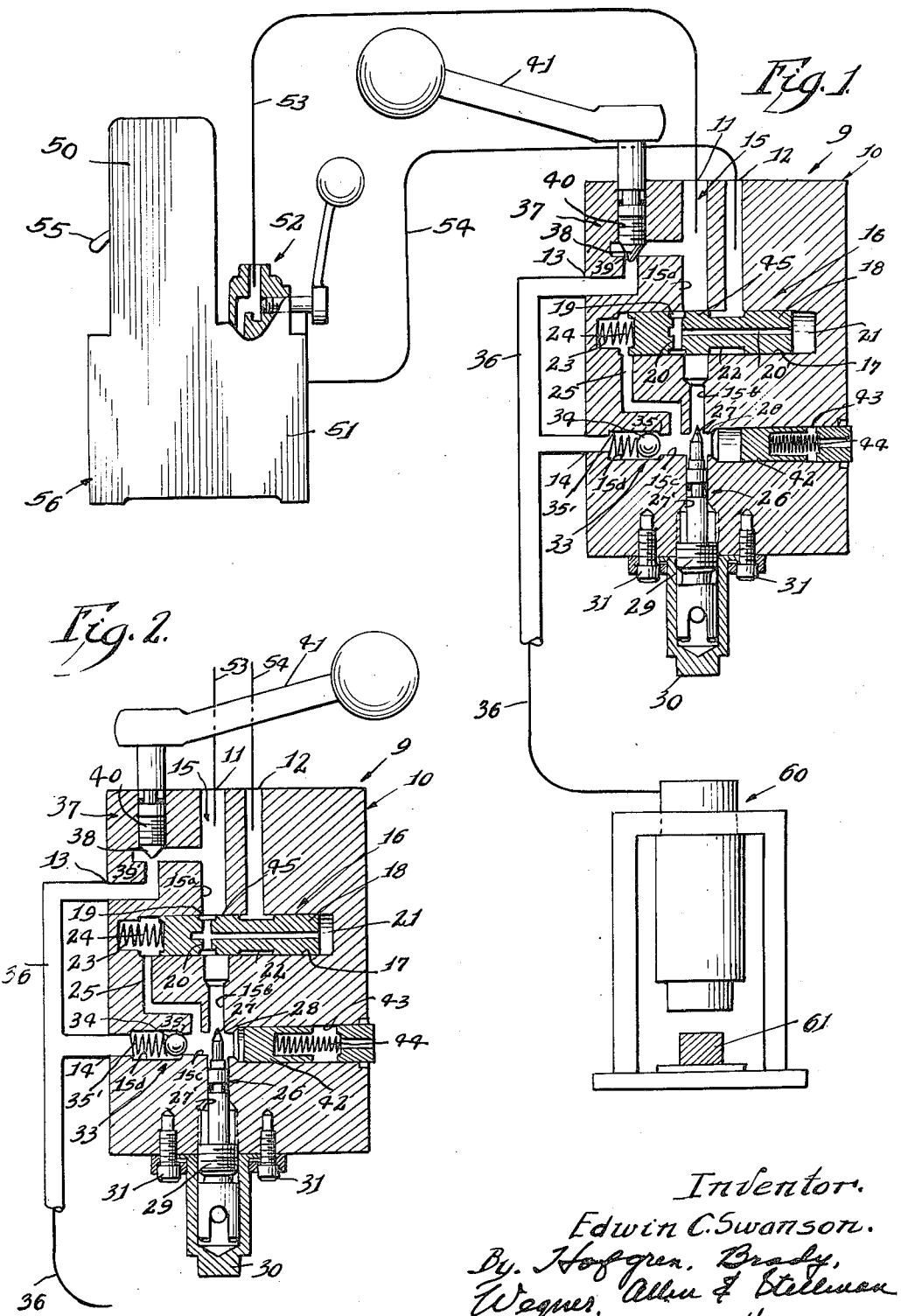
Inventor.
Edwin C. Swanson.
By Hofgren, Brady,
Wegner, Allen & Stellman
Attorneys

United States Patent Office 3,217,731
Patented Nov. 16, 1965

3,217,731
HYDRAULIC FLOW CONTROL VALVE UNIT
Edwin C. Swanson, Rockford, Ill., assignor to Greenlee Bros. & Co., a corporation of Illinois
Filed Dec. 1, 1961, Ser. No. 156,256
9 Claims. (Cl. 137—116.3)

This invention relates to hydraulic flow control valve units and more particularly to new and useful improvements in pressure compensated hydraulic flow control valve units.

It is a general object of the invention to provide a valve unit of new and improved construction for controlling the flow of hydraulic fluid under high pressure.

More particularly it is an object of the invention to provide such a valve unit embodying a metering valve for adjusting the flow of fluid together with a pressure operated flow control valve and means for preventing pulsating flow of the fluid when said fluid is supplied by a piston type pump.

Another object is to provide a new and improved flow control unit for providing initially a large volume flow for advancing a ram or the like at a rapid rate toward a work position and then a reduced small volume flow for advancing the ram at a nicely controllable lesser rate through a work stroke.

Other objects and advantages will become readily apparent from the following detailed description, taken in connection with the accompanying drawings in which:

FIGURE 1 is a sectional view of a valve unit embodying the invention, together with a fluid pump, fluid reservoir and ram press, the valve units parts being positioned for fluid flow through the main, flow controlling passage; and FIGURE 2 is a sectional view of the valve unit with a manual bypass valve open, diverting flow from the main passage.

Referring now to the drawings, as illustrated, the invention is embodied in a valve unit 9 shown in an environment including a reciprocal piston type pump 50, a fluid reservoir 51 and a single acting ram 60. Fluid line 53 leads from the pump to valve unit 9; line 54 leads from valve unit to 9 the reservoir; line 36 leads from the valve unit to the ram.

The valve unit 9 includes a valve body 10 having four fluid ports therein, an inlet port 11, a bypass port 12, and two outlet ports 13 and 14. The inlet port 11 leads to a first passage 15 which is composed of bores 15a, 15b, 15c and 15d, the latter bore leading to the outlet port 14.

Disposed in said passage 15 between the inlet port 11 and the outlet port 14 are three valve means: a fluid control valve, shown generally at 16; a metering valve, shown generally at 26; and a check valve, shown generally at 33.

The flow control valve 16 disposed transversely in bore 15a includes a cylindrical bore 17 in the valve body 10 and a cylindrical valve member 18 in the bore 17, said valve member 18 having a first annular groove 19 connected by radial ports 20 and an axial port 20' to the right hand or closed end 21 of the cylindrical bore 17. A second annular groove 22 on valve member 18 is located so as to connect the inlet port 11 and the bypass port 12 at various times as will be later described. Also included in the flow control valve is a spring 23 at the left hand or open end 24 of the cylindrical bore 17 urging the valve member 18 to be positioned so as to permit fluid flow through the passage 15. Open end 24 of bore 17 is connected by a passage 25 to bore 15c which is between the metering valve 26 and the check valve 33.

The metering valve 26 includes a needle valve member 27 slidable in a bore 27'. Said valve 26 meters the fluid flow through passage 15 in cooperation with valve port 28, and is adjustable by means of an adjustment thread 29 which controls the position of needle 27 in relation to the valve port 28. Valve member 27 is covered by a flanged cap 30 attached to the valve body as by screws 31.

The check valve 33 in passage 15 is located on the outlet side of metering valve 26, and permits fluid flow in one direction only, that is, out of the outlet port 14, thus preventing fluid flow back into passage 15. Check valve 33 includes a ball valve member 34, which cooperates with a seat provided by shoulder 35 at the juncture of bores 15c and 15d. A spring 35' acts normally to position the ball 34 against the seat 35. The check valve prevents flutter in the pressure at the ram which may occur on pump piston intake strokes.

An alternate passage 36 connecting inlet port 11 and outlet port 14 allows fluid flow to the ram 60 without utilizing passage 15. This alternate passage 36 is controlled by a manual valve 37, which comprises a conical valve member 38 provided with adjusting threads 40 and a handle 41. The valve member cooperates with an annular seat 39 to control fluid flow in the passage 36.

As shown, a piston 42 is slidably mounted in a cylinder 43 on the outlet side of valve 26, and resiliently biased by spring 44. As the pressure increases in passage 15, piston 42 is urged against spring 44, and in so moving, increases the volume in passage 15 for a purpose that will appear.

In operation, when valve 52 is open, as in FIGURE 1, the pump 50 delivers fluid from reservoir 51 past open valve 52 through line 53 to the valve inlet port 11. From this point, the valve unit may be operated in either of two ways. The first consists of a large volume fluid flow to the ram 60, when manual valve 37 is opened as in FIGURE 2. This allows a direct and unrestricted large volume fluid flow through passage 36 to ram 60, giving rapid advance of the ram to the work 61, with the fluid pressure in passage 36 closing check valve 33. Since the check valve is closed, no fluid flows out of outlet port 14, and the pressure acting against the left end of valve member 18 rises to a value preventing valve member movement to a position where annular groove 22 connects inlet port 11 to bypass port 12.

If manual valve 37 is now closed as shown in FIGURE 1, fluid flow to the ram is through passage 15. Fluid passes through the annular groove 19 in the fluid control valve 16, past needle 27 of the metering valve 26, past ball 34 of the check valve 33, through outlet port 14 and on to the ram 60. If the pressure from pump 50 decreases momentarily or otherwise, as between pump piston strokes, below the pressure in the ram 60, the ball 34 in check valve 33 will be forced against valve port 35 stopping the return of fluid to valve body 10. This prevents flow back through passage 15 while holding the ram 60 in a static position.

The metering valve 26 is adjustable to control the amount of fluid flowing through passage 15 by limiting or enlarging the area between needle 27 and valve port 28.

As the fluid flows through annular groove 19 of the flow control valve 16 it also flows through axial port 20' and creates pressure in the closed end 21 of cylindrical bore 17. As this pressure increases it tends to move the cylindrical valve member 18 towards the open end 24 of the cylindrical bore 17 and allow the second annular groove 22 to connect the inlet port 11 and the bypass port 12, thus allowing some fluid to return to the fluid reservoir 51 through line 54. However, fluid pressure in open end 24 of the cylindrical bore 17, conveyed through passage 25 from bore 15c, plus the force of spring 23, opposes the pressure in end 21 and positions land 45, which is slightly shorter than the diameter of bore 15a, in an intermediate position, allowing some flow to outlet port 14 and some flow to bypass port 12.

The control valve unit permits use of a standard pump mechanism as at 50 of a radial piston type, for example, which may include only a small number of pistons, two, for example, which may tend to provide a pulsating flow. As the flow (and pressure) from the pump varies, the flow control valve 16 will compensate for these variations, passing more or less fluid to the outlet port 14, and less or more fluid to the bypass port 12 so that a constant flow will be available at the ram 60 regardless of pressure variations at the pump. More particularly, the flow to the ram is determined by the metering valve 26, and the position of needle valve member 27 is set for a desired rate of flow. Flow control valve member 18 adjusts automatically in response to pressure variations at the pump to maintain a constant small volume flow nicely controllable to accurately control the ram. Specifically, opposite ends of valve member 18 have equal areas. Thus, the pressure exerted against the right end of the valve member is opposed by the reduced pressure exerted against the left end of the valve member plus the force of the spring 23. Fluid pressure acting against the left end of valve member 18 is less than that acting against the right end of the valve member because of the pressure drop due to flow through the metering valve 26. Valve member 18 always seeks a position which maintains a pressure differential between bore 15b and bore 15c equivalent to the thrust of spring 23. Thus, the pressure drop across the metering valve always equals the spring thrust, and since the spring thrust is relatively contant, the pressure drop will be relatively constant.

A pressure variation at the inlet port will mometarily unbalance the forces acting on the valve member 18 causing it to move and vary the valve opening connecting bore 15a and bore 15b. This results in a change of pressure drop across the valve member to compensate for pressure fluctuation. For example, if the pressure drops at the inlet port, valve member 18 moves towards the right enlarging the valve opening and increasing the flow across the valve. In the event of a pressure increase in the inlet port, the valve member moves toward the left restricting the flow across the valve.

Piston 42 is movable in cylinder 43 as described hereinabove. This piston 42 operates to prevent an initial surge to the ram 60 if the pump 50 is first started with manual valve 37 closed. For example, when ram 60 comes to rest in the advance direction against the work 61 and cannot retract because of check valve 33 and closed manual valve 37, pumping unit 50 may be turned completely off or adjusted to operate without delivering pressure. The flow control valve 16, which previously had positioned itself for proper metering, will, because of pressure from spring 23, move toward the right, and simultaneously, the surge piston 42 will move to the left because of pressure from spring 44, and will remain in this position until pressure is again exerted through the valve unit 9. When pressure is to be restored to the ram again for further advance, it is desirable, and in many cases absolutely necessary, that the advance be smooth without jump or jar, but this would not occur without surge piston 42 because with flow control valve 16 in the extreme right position the fluid in cavity area 24 will join forces with the volume of fluid from the pumping source 50 and cause the ram 60 to surge forward causing damage to the tool. With the arrangement illustrated, piston 42 will move to the right as shown in FIGURE 1 to compensate for the sudden surge in pressure, and as the pressure becomes constant or nearly so, spring 44 returns to piston 42, and thus readies the mechanism to compensate for future surges.

To return ram 60 to its starting position, pump 50 is shut off, as by a motor switch 55. With valve 37 closed, the pressure in the ram will close check valve 33 as before described, and the ram 60 will rest in a static position. Now by opening valve 37, fluid is returned to the fluid reservoir as by suitable valve means in housing 56, the pressure at the ram 60 is decreased, and the ram 60 may be returned to starting position by spring or other means, such as gravity, well known in the art.

As modifications will be obvious to anyone skilled in the art, the present disclosure is to be considered as an exemplification of the principles of the invention and is not intended to limit the invention to the embodiment illustrated and described. The scope of the invention will be pointed out in the appended claims.

I claim:

1. A flow control valve unit, comprising: a valve body including inlet, outlet and bypass ports; a first passage connecting the inlet port and the outlet port; a flow control valve in said first passage operable to control the flow or fluid selectively therethrough to either or both of said outlet and bypass ports, said flow control valve including a cylindrical valve bore in said valve body, a cylindrical valve in said bore having a first annular groove adapted when the valve is in an open position to form a portion of said first passage, and a second annular groove adapted when the cylindrical valve restricts said passage to pass fluid from the inlet port to the bypass port, said cylindrical valve having a channel therein from said first annular groove to one end of cylindrical valve bore, a spring in the other end of the cylindrical valve bore urging said cylindrical valve towards the one end of the bore, and a second passage in said valve body connecting said other end of said bore with the first passage at a point downstream of the flow control valve; a metering valve in said passage disposed between the flow control valve and the second passage to adjust the flow of fluid to the outlet port; and a check valve in said outlet port allowing fluid flow out of the outlet port but precluding fluid flow from the outlet port back to said first passage.

2. A flow control valve unit, comprising: a valve body having inlet, outlet and bypass ports; a first passage connecting the inlet port and the outlet port; a flow control valve operable to control the flow of fluid through said passage to either the outlet port or the bypass port, said flow control valve including a cylindrical valve bore in said valve body, a cylindrical valve in said bore having a first annular groove adapted when the valve is in an open position to form a portion of said first passage, and a second annular groove adapted when the cylindrical valve restricts said passage to pass fluid from the inlet port to the bypass port, said cylindrical valve having a channel therein from said first annular groove to one end of the cylindrical valve bore, a spring in the other end of the cylindrical valve bore urging said cylindrical valve towards the one end of the bore, and a second passage in said valve body connecting said other end of said bore with the first passage at a point downstream of the flow control valve; and a metering valve disposed between the flow control valve and the second passage adjustable to control the flow of fluid through said first passage.

3. A flow control valve unit, comprising: a valve body including inlet, outlet and bypass ports; a first passage connecting the inlet port and the outlet port; a flow control valve in said first passage operable to control the flow of fluid selectively therethrough to either or both of said outlet and bypass ports, said flow control valve including a cylindrical valve bore in said valve body, a cylindrical valve in said bore having a first annular groove adapted when the valve is in an open position to form a portion of said first passage, and a second annular groove adapted when the cylindrical valve restricts said passage to pass fluid from the inlet port to the bypass port, said cylindrical valve having a channel therein from said first annular groove to one end of the cylindrical valve bore, a spring in the other end of the cylindrical valve bore urging said cylindrical valve towards the one end of the bore, and a second passage in said valve body connecting said other end of said bore with the first passage at a point downstream of the flow control valve; a restricted orifice in said first passage between said flow control valve and said second passage; and a check valve in said outlet port allowing fluid flow out of the outlet port but precluding fluid flow from the outlet port back to said first passage.

4. A flow control valve unit, comprising: a valve body having inlet, outlet and bypass ports; a first passage connecting the inlet port and the outlet port; a flow control valve operable to control the flow of fluid through said passage to either the outlet port or the bypass port, said flow control valve including a cylindrical valve bore in said valve body; a cylindrical valve in said bore having a first annular groove adapted when the valve is in an open position to form a portion of said first passage, and a second annular groove adapted when the cylindrical valve restricts said passage to pass fluid from the inlet port to the bypass port; means providing a conduit from said inlet port to one end of the cylindrical valve bore; a spring in the other end of the cylindrical valve bore urging said cylindrical valve toward the one end of the bore; means providing a restrictive orifice in said first passage disposed between the flow control valve and the outlet port; and a second passage in said valve body leading from the first passage between the restrictive orifice and the outlet port and connected to the other end of said bore.

5. A combination as defined in claim 4 including a check valve in said first passage between said second passage and said outlet port; a piston in a cylinder in the valve body having an open end connecting with the first passage between the restrictive orifice and the outlet port; and spring means urging the piston toward the open end of the cylinder to absorb pressure surges when flow starts through the valve body.

6. A combination as defined in claim 5 including an alternate passage between the inlet port and the outlet port; and a manually operable valve controlling the alternate passage operable when open to bypass the first passage.

7. A combination as defined in claim 4 including an alternate passage between the inlet port and the outlet port; a manually operable valve controlling the alternate passage operable when open to bypass the first passage.

8. A combination as defined in claim 4 including a piston in a cylinder in the valve body having an open end connecting with the first passage between the restrictive orifice and the outlet port; and spring means urging the piston toward the open end of the cylinder to absorb pressure surges when flow starts through the valve body.

9. A combination as defined in claim 8 including an alternate passage between the inlet port and the outlet port; and a manually operable valve controlling the alternate passage operable when open to bypass the first passage.

References Cited by the Examiner

UNITED STATES PATENTS

| | | | |
|---|---|---|---|
| 1,244,382 | 10/1917 | Slinack | 137—610 XR |
| 2,632,458 | 3/1953 | Slomer | 137—568 XR |
| 3,024,798 | 3/1962 | Banker | 137—117 XR |
| 3,029,949 | 4/1962 | Whitlock | 137—599 XR |
| 3,082,787 | 3/1963 | Elston et al. | 137—117 X |
| 3,083,721 | 4/1963 | Matthews et al. | 137—599 XR |

ISADOR WEIL, *Primary Examiner.*

WILLIAM F. O'DEA, *Examiner.*